Dec. 17, 1957 W. A. ERICKSON 2,816,843
IMPRESSION COMPOSITION
Filed July 27, 1955 2 Sheets-Sheet 1
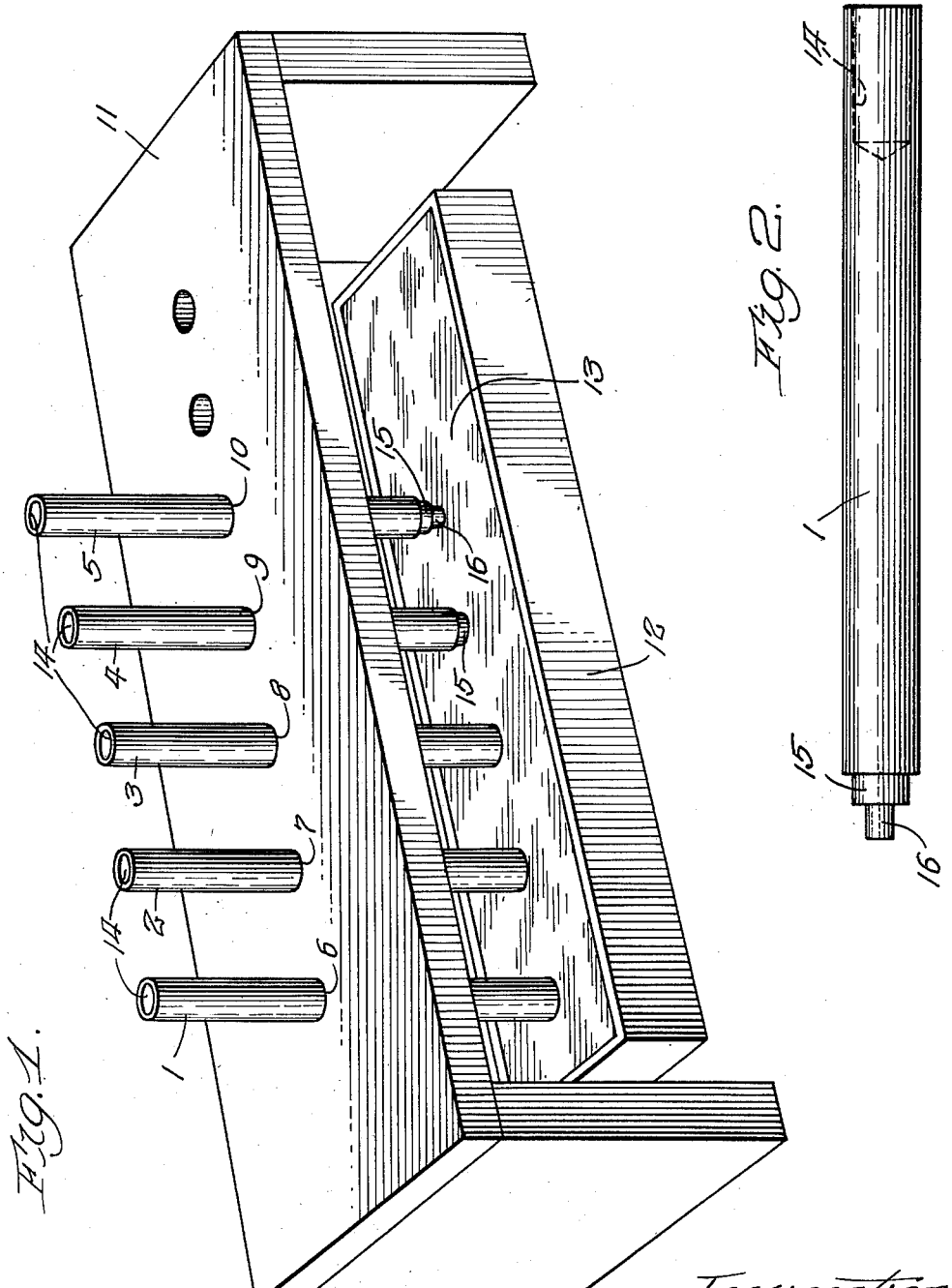
Inventor:
Wallace A. Erickson,
By Merriam & Lynch,
Attys.

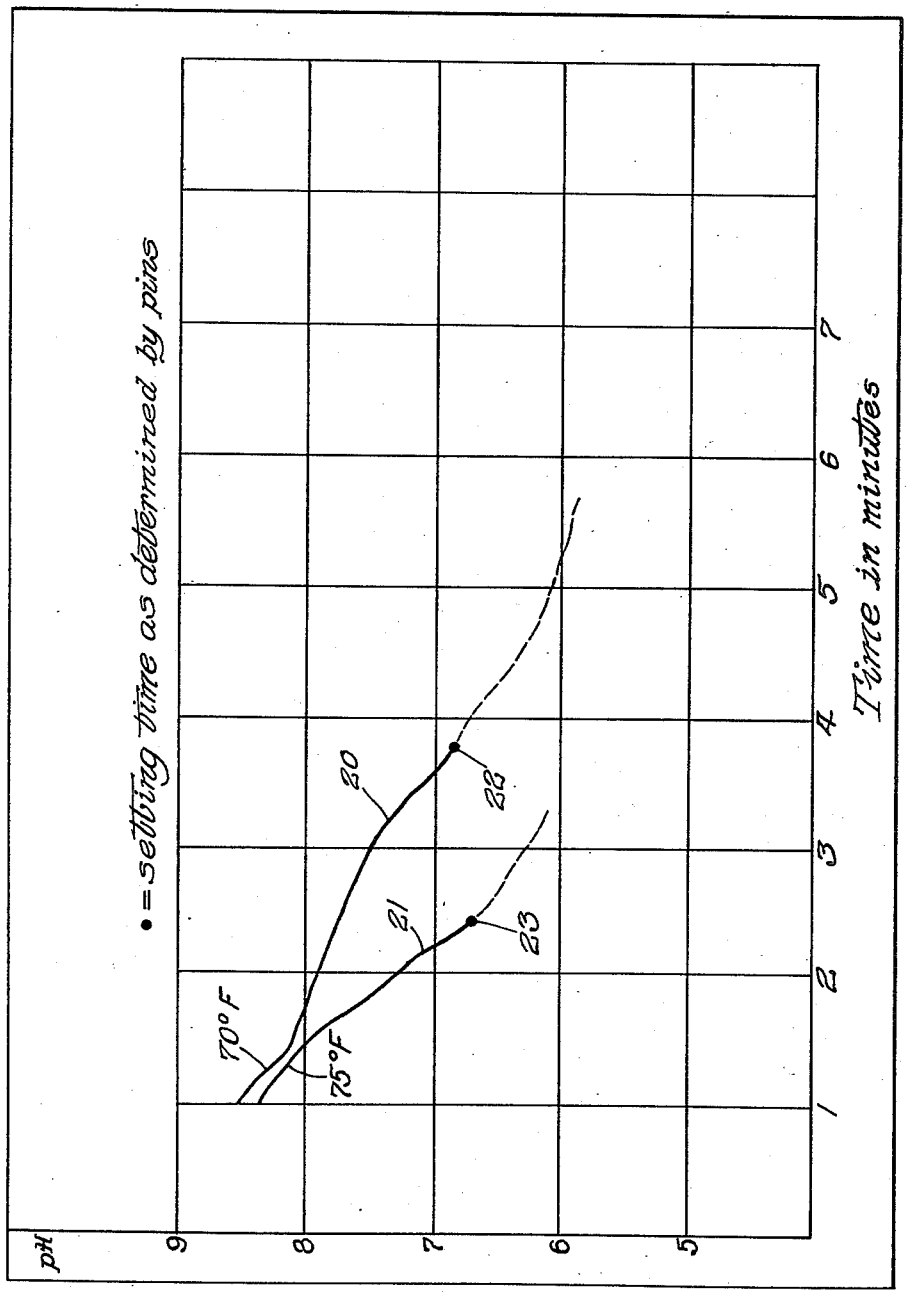

United States Patent Office 2,816,843
Patented Dec. 17, 1957

2,816,843

IMPRESSION COMPOSITION

Wallace A. Erickson, Chicago, Ill., assignor to Wallace A. Erickson & Co., a corporation of Illinois Application July 27, 1955, Serial No. 524,633

2 Claims. (Cl. 106—38.5)

This invention relates to a dental impression composition and more particularly to an impression material including an indicator adapted to change color at at least one predetermined stage of the reaction. Non-reversible hydrocolloidal impression materials have come into vogue in the last few years. These include a non-reversible hydrocolloid, a chemical which reacts therewith, a filler, and normally a retarder to slow down the rate of reaction. The reactant is normally a slowly soluble chemical which will react with the non-reversible colloid. The retarder is another chemical which will remove the ions of the reactant as they are formed until the retarder has been used up and will thus delay the time of initiation of setting.

The non-reversible hydrocolloid is usually a soluble alginate salt such as sodium or potassium alginate. In that case, the reactant is normally a relatively insoluble calcium salt such as calcium sulfate which slowly yields calcium ions. The calcium ions react with the alginate to form a gel which is the impression taking material. The retarder is a compound which precipitates or sequesters calcium ions because it includes an ion which combines with calcium to form a salt more insoluble than calcium alginate or which is less ionized than calcium alginate. Retarders are compounds such as trisodium phosphate in limited amount, sodium tri-polyphosphate, or similar materials. Until the phosphate is exhausted, the ions yielded by the dissolving calcium sulfate are removed and will not react with the alginate. When the phosphate is exhausted, calcium alginate will form and the mixture will gel.

If desired, non-reversible hydrocolloids such as gellable oxidized cellulose type of compounds as exemplified by sodium carboxymethyl cellulose may be used.

It is obvious that the chemical formulation of the material can be altered to change the time of setting over a fairly wide range. Furthermore, the temperature and other conditions may alter this time of setting.

The mixtures are usually made up in dry form, or are made up separately into pastes, one of which includes the reactant and the other of which includes the colloid. The dentist requires time to mix water with the dry composition or to mix the pastes together and then pour them into a tray which is then placed in the mouth. I have discovered that once the water is added to the dry mixture or the pastes are mixed, the pH of the resulting reaction mixture constantly changes.

Inasmuch as the dentist cannot accurately control the temperature of the water he uses, he cannot be certain of the time he has in which to carry out his mixing or which may be required for placing in the mouth. I have found that during the course of the reactions and gelatin a change in pH occurs which is independent of time alone, but dependent upon the extent of the various reactions which are taking place. I have, therefore, found that it is possible to incorporate in the material an indicator which will show, independently of time alone, the status of the reactions including gelation. The particular indicator employed for this purpose is one which changes color at the pH accompanying or associated with the reactions. In this respect, I include white as a color, since the important thing is to have a visible change. However, the pH is dependent upon the composition of the mixture used and, therefore, an indicator must be selected which will denote the desired stage or stages of the reactions.

One of the outstanding features of my invention is the discovery of a testing procedure for precisely determining a specific, definable, reproducible gel point. Formerly, the gel point was generally understood to refer to the progression of the gelling reaction to the stage that the mixture has converted to a water insoluble elastic gel of such strength and rigidity as to be capable of removal from all normal irregularities or undercuts in the mouth without breakage of the impression and without appreciable shape and dimension variation from the shape and dimensions of the subjects to be cast (by plaster of Paris poured against the impression). Obviously, this conventional definition of gel point in actuality covers a range (e. g., not a specific point) which has not been capable, heretofore, of being accurately or specifically defined or identified. Our testing procedure reveals a specific, definable, reproducible gel point which falls within the vague extremities that formerly identified the gel point.

The advantages of being able to define a specific, definable, reproducible gel point are noteworthy. For example, by being able to determine a precise gel point, more accurate time intervals relating to steps commonly employed in preparing the reaction mixture for use in the mouth may be precisely ascertained.

The impression material may be supplied with an indicator which will change color at a predetermined time before the specific, definable, reproducible gel point is reached; this will give the dentist a predetermined time after the desired color change occurs to get the material into the tray and into the mouth. Likewise, an indicator may be employed to show a color change when gelation has been completed, so that the dentist may remove the material from the mouth when this color change occurs. It is also possible to combine two indicators so that a color change occurs in the same composition for both purposes, that is, at least a predetermined time before said gel point is reached and at a time when gelation and the accompanying chemical changes have been completed.

Indicators may be employed in the impression material which show a color change at a pH of about 5.5 in order to show the completion of gelation. At this point the dentist may remove the impression material from the mouth. The following indicators may be used to show the completion of gelation:

| Indicator | pH | Color Change |
| --- | --- | --- |
| Bromphenol Red | 7.0–5.2 | Red to yellow. |
| Bromcresol Purple | 6.8–5.2 | Purple to yellow. |
| Heptamethoxy Red | 7.0–5.0 | Colorless to red. |

The following indicators may be incorporated into the impression composition in order to indicate a color change at a predetermined time prior to the reaching of the specific, definable, reproducible gel point:

| Indicator | pH | Color Change |
| --- | --- | --- |
| Tropaeolin OOO No. 1 (Orange I) | 8.9–7.6 | Red to yellow. |
| Metacresol Purple | 9.0–7.4 | Purple to yellow. |
| α-Naptholphthalein | 8.7–7.3 | Green to purple. |
| Cresol Red | 8.8–7.2 | Red to yellow. |
| Neutral Red | 8.0–6.8 | Yellow to red. |
| Phenol Red | 8.4–6.8 | Red to yellow. |

In the accompanying drawings:

Figure 1 is a diagrammatic prospective view of testing apparatus employed in determining a specific definable, reproducible gel point of the reaction mixture; and Figure 2 shows one of the testing pins illustrated in Figure 1; and Figure 3 is a chart showing the relationship of time and the temperature of a reaction mixture with a specific, definable, reproducible gel point.

In Figure 1 testing pins 1—5 are shown positioned in openings 6—10, respectively, in the supporting frame 11. The outermost protruding concentric extensions 16 of the pins are shown extending into or in space relationship to the reaction mixture 13 which fills the trough 12.

Figure 2 shows testing pin 1 with its inner protruding concentric extension 15, outermost protruding concentric extension 16, and a hole 14 in top of the testing pin. Holes, such as hole 14, have been drilled into the testing pins in order that the weight of each of the testing pins may be adjusted to 20 grams.

The chart shown in Figure 3 shows the relationship of time, the temperature of a selected reaction mixture, and a specific, definable, reproducible gel point. The lines 20 and 21 in Figure 3 show the values that are obtained in conducting Examples 1 and 2, respectively. It is to be noted that there is a constantly continuing decreasing change in pH of the mixture.

I have found that metal testing pins having the following specifications may be satisfactorily employed in determining a specific, definable, reproducible gel point:

| | |
|---|---|
| Over-all length_____inches__ | 3 |
| Diameter_____do____ | ⅜ |
| Diameter of the inner concentric extension___do____ | ¼ |
| Diameter of the outer concentric extension__do____ | ⅛ |
| Length of inner concentric extension_____do____ | 3/32 |
| Length of outer concentric extension_____do____ | 3/32 |
| Weight_____grams__ | 20 |

The holes 6—10 in the supporting frame 11 should be sufficiently large so as to permit the testing pins to drop freely into the reaction mixture; and, at the same time, they should be sufficiently small so as to enable the testing pins to fall on the longitudinal center line of the reaction mixture aligned through 12. Consequently, the holes will provide a snug fit for the testing pins, but will not hinder the downward movement of released pins.

The following procedure may be used in determining a specific, definable, reproducible gel point.

TESTING PROCEDURE

To 25 grams of a prepared dry dental impression composition containing a non-reversible hydrocolloid add 60 cc. of water (e. i., distilled). Mix thoroughly for one minute, at which time the testing trough is completely filled with the resulting paste; excess paste is scraped from the top of the trough in order to present a level surface. The testing trough is placed under the supporting frame and aligned therewith so that the testing pins will fall along the longitudinal center line of the trough. About fifteen seconds before the mixture is known to set, the first pin is lowered through its aligning hole until the outermost protruding concentric extension just contacts the surface of the reaction mixture. The pin is then released. The first pin should sink to the bottom of the trough. Five seconds after the first pin is released, the second pin is released in the same manner. The remaining pins are dropped in a similar manner. Each pin is released five seconds after the preceding pin. The thirty-second time period embraced by the dropping of the pins should encompass the time at which the reaction mixture reaches a specific, definable, reproducible gel point. This gel point is taken as that point in time at which the gel has become so rigid as to support any of the testing pins solely on its outermost protruding concentric extension.

Example 1

Twenty-five grams of the following composition is mixed with 60 cc. of distilled water (at a temperature of 70° F.) containing 0.1 gram of phenol red indicator:

| | Parts by weight |
|---|---|
| Hydrocal (calcium sulfate hemihydrate)_____ | 100 |
| Tetrasodium pyrophosphate_____ | 13 |
| Sodium silicofluoride (Na₂SiF₆)_____ | 20 |
| Kelmar (potassium alginate)_____ | 50 |
| Lead monosilicate_____ | 125 |
| Kelcosol (sodium alginate)_____ | 25 |
| Hyflo (diatomaceous earth)_____ | 167 |

These materials are mixed in a suitable bowl for 1 minute, at which time the reaction mixture will be a smooth, homogeneous paste with a pH of above 8. At this pH, the indicator will color the reaction mixture a bright red. The testing trough is then filled with the reaction mixture in the manner described supra, and the trough is aligned under the supporting frame. By this time, about 1 minute and 30 seconds will have elapsed from the initial mixing of the materials and the pH will have dropped to about 8. At this pH, the color of the reaction mixture will be markedly less red (e. g., salmon-pink). During the next minute the color of the reaction mixture will become progressively lighter in color and will take on a distinct yellowish hue. It is in the time period during which this color change takes place that the dentist should place the impression material in the patient's mouth. In the next 60 seconds (e. g., at the 2½ to 3½ minute time interval) the reaction mixture will become a very intense yellow. After the reaction mixture has assumed this yellow color the diminution of the retarding ions is substantially completed and the gel reaction is about to commence. The gel reaction under these conditions will commence at about 3 minutes and 30 seconds after the addition of the water.

It is at this point that the pins are dropped into the reaction mixture in order to determine the gel point. It will be found that under the described conditions the fourth pin (e. g., the pin released at 3 minutes and 45 seconds) will be the first pin to be supported solely by its outermost protruding concentric extension; a specific, definable, reproducible gel point will, thus, have been reached, and the impression material may be removed from the mouth of the patient.

The line 20 shown in the chart in Figure 3 is a graphical representation of the results obtained by employing the procedure set forth in Example 1. Dot 22 indicates the specific, definable, reproducible gel point and the broken lines indicate the results that will be obtained after this point is reached.

Example 2

Twenty-five grams of the dry composition set forth in Example 1, supra, is mixed with 60 cc. of distilled water (at a temperature of 75° F.) containing 0.1 gram of phenol red indicator. After these materials are mixed, the same procedure recited in Example 1 is followed.

At this higher temperature (e. g., 75° F.) the reaction will proceed more rapidly, that is, the pH will drop more rapidly, the various yellow colors will appear earlier, the gel reaction will begin sooner, and the gel point will be reached earlier.

Under these conditions, the dropping of the pins should begin considerably earlier than in Example 1 in order to anticipate the more rapid setting of the reaction mixture. A specific, definable, reproducible gel point will occur at 2 minutes and 20 seconds after the addition of the water.

The line 21 shown in the chart in Figure 3 is a graphical representation of the results obtained by employing the procedure set forth in Example 1. Dot 23 indicates the specific, definable, reproducible gel point and the broken lines indicate the results that will be obtained after this point is reached.

*Example 3*

| | |
|---|---|
| Hydrocal (calcium sulfate hemihydrate)___grams__ | 211 |
| Sodium tripolyphosphate_____do____ | 45 |
| Sodium silicofluoride_____do____ | 28 |
| Kelmar (potassium alginate)_____do____ | 90 |
| Kelcosol (sodium alginate)_____do____ | 64 |
| Lead silicate_____ | 223 |
| Hyflo (diatomaceous earth)_____ | 349 |

Of this mixture, 25 grams was spatulated in a rubber bowl with 59 cc. water and 1 cc. 2% by weight phenophthalein in 95% ethanol at 75° F. The mixture was pink in color at the beginning of mixing. After about 50 seconds of mixing the color began to fade appreciably and at the end of 60 seconds of mixing the pink color had been completely discharged. The material gelled at 3 minutes 45 seconds. Thus, without reference to the clock, the dentist could mix until the pink color of the material had disappeared and he would then have ample time to place the impression properly in the mouth.

*Example 4*

| | |
|---|---|
| Hydrocal (calcium sulfate)_____grams__ | 211 |
| Sodium tripolyphosphate_____do____ | 45 |
| Sodium silicofluoride_____do____ | 48 |
| Kelmar (potassium alginate)_____do____ | 90 |
| Kelcosol (sodium alginate)_____do____ | 64 |
| Lead silicate_____ | 223 |
| Hyflo (diatomaceous earth)_____ | 349 |

Of this mixture, 25 grams was thoroughly spatulated in a rubber bowl with 58 cc. water and 1 cc. 2% methyl red solution and 1 cc. 2% meta cresol purple. The mixture had a strong purple color which began to fade at 50 seconds of mixing. At the end of 60 seconds of mixing the mixture was bright yellow. At this point the material was transferred to a tray and placed in a patient's mouth. A portion was also placed in the hand in order more easily to observe the gelation and color changes. At two minutes 35 seconds the mixture began to show signs of gelling around the edges. In these very spots in which gelling began the material developed a reddish color. At the end of 4½ minutes the mass had completely gelled and was uniformly red in color. During this transition period when some parts of the mass were yellow and other parts were red, a distinct difference in the consistency could be observed. When a spatula was used to cut the surface of the mass, the spatula cut cleanly through the red portion, showing that gelation had taken place. In the yellow parts, however, the material adhered to the spatula, showing that gelation had not occurred. Thus, by the combination of the two indicators, the dentist can tell from the appearance of the impression material—without reference to the clock—when the mixing is complete and he can place the material in the mouth, and when the gelation is complete and he can remove the impression from the mouth.

*Example 5*

A paste was made by mixing

| | |
|---|---|
| 1% brom thymol blue solution _____cc__ | 2 |
| Water _____cc__ | 236 |
| Tetra sodium pyrophosphate _____grams__ | 4 |
| Hyflo _____do____ | 38 |
| Sodium polypectate _____do____ | 20 |
| | Grams__ 300 |

Of this blue paste, 60 grams was mixed with 20 grams of a white paste made by mixing

| | |
|---|---|
| Water _____ | 275.0 |
| Boric anhydride _____ | 2.4 |
| Calcium sulfate _____ | 80.0 |
| Carboxy methyl cellulose _____ | 7.2 |
| Hyflo _____ | 35.4 |
| | 400.0 |

At 1 minute 15 seconds after the mixing of the two pastes was started, the color changed from the bluish shade to a light yellow. The mixture gelled at two minutes (45 seconds later) to give a usable impression of somewhat lower strength than the corresponding alginate gels.

*Example 6*

Another two color mixture similar to Example 2 was made using as the two indicators phenolphthalein and 2,4,2′,4′,2″,4″,6″ heptamethoxy triphenyl carbinol. The first color change from red to colorless indicates the time at which mixing could be stopped and material transferred to a tray and placed in the mouth. The second color change from colorless to reddish blue took place immediately after the gelation of the material and indicated the time at which the impression could be removed from the mouth.

*Example 7*

A dry mix is made with the following ingredients:

| | |
|---|---|
| Trisodium phosphate dodecahydrate_____ | 5.0 |
| Calcium sulfate dihydrate_____ | 10.5 |
| Sodium alginate_____ | 20.0 |
| Diatomaceous earth_____ | 114.5 |
| | 150.0 |

Of this blend, 18.5 grams is mixed with 60 cc. water to which 15 drops of a 1% solution of phenolphthalein in alcohol has been added. After mixing for 2 minutes, 20 seconds the red color disappeared and at 3 minutes, 20 seconds the material began to set. This allowed a working time of one minute to transfer the material to the tray and into the patient's mouth.

*Example 8*

A mixture identical with the above was prepared except that the phenolphthalein was distributed on the diatomaceous earth. This was done by spraying 5 cc. of a 1% solution of phenolphthalein in alcohol onto 114.5 grams of diatomaceous earth and drying in an oven at 60° C. This diatomaceous earth was used to prepare a mixture similar to Example 5.

Of this mixture, 18.5 gram portions were mixed with 60 cc. portions of water at each of the following temperatures with the following results:

| Temperature of Water, ° F. | Time of Color Disappearance | Time of Initiation of Gelation | Time Lapse Between Color Change and Initiation of Gelation |
|---|---|---|---|
| 47½ | 4:25 | 5:25 | :60 |
| 60 | 3:05 | 4:10 | :65 |
| 70 | 2:20 | 3:20 | :60 |
| 80 | 1:55 | 3:00 | :65 |
| 90 | 1:40 | 2:30 | :50 |

From the above table it is noted that the time lapse between color change and initiation of gelation when the temperature of the water is 60–90° F. is approximately the last 30% of the period of time calculated from the addition of water to the initiation of gelation of the mixture.

We have found that the indicator may be added to the components of the reaction mixture in a solid form or in an aqueous solution.

Other suitable hydrocolloids include materials such as poly-sugar-acids, pectic acid, and the like. The alginate is the one commonly used. Likewise, calcium salts, such as calcium sulfate are commonly used; but other calcium salts and compounds of a polybasic metal that are chemically reactive with the hydrocolloid have been suggested for reactants, and the use of an indicator is of equal value in such impression materials.

The filler material may be any inert diluent. In place of diatomaceous earth, silica, bentonite, clay, and the like may be employed. However, materials such as calcium carbonate and magnesium carbonate are normally avoided because they tend to keep the pH from dropping sufficiently to change the color of the indicator.

This application is a continuation-in-part of my copending application Serial No. 293,449, filed June 13, 1952.

The foregoing detailed description has been given for clearness of understanding only and no unnecessary limitations should be understood therefrom, as modifications will be obvious to those skilled in the art.

I claim:

1. A dental impression material having the property of undergoing a constantly continuing decreasing change in pH over a period of at least about two minutes calculated from the addition of water thereto until the initiation of gelation of said material is reached at a known pH comprising a non-reversible hydrocolloid, a compound of a polybasic metal chemically reactive with said hydrocolloid in solution, said compound being present in an amount sufficient to form an elastic gel by reaction with said hydrocolloid, and a pH indicator which changes color in a solution of said material at least 45 seconds prior to said initiation of gelation.

2. A dental impression material having the property of undergoing a constantly continuing decreasing change in pH over a period of time calculated from the addition of water thereto until the initiation of gelation of said material is reached at a known pH comprising a non-reversible hydrocolloid, a compound of a polybasic metal chemically reactive with said hydrocolloid in solution, said compound being present in an amount sufficient to form an elastic gel by reaction with said hydrocolloid, and a pH indicator which changes color in a solution of said material over approximately the last 30% of said period of time prior to initiation of gelation, said pH indicator starting to change color at the beginning of said last 30% of said period of time and completing said change of color at the end of said period of time.

References Cited in the file of this patent

UNITED STATES PATENTS 2,678,280    Noyes et al. _____ May 11, 1954

UNITED STATES PATENT OFFICE

CERTIFICATE OF CORRECTION

December 17, 1957

Patent No. 2,816,843

Wallace A. Erickson

It is hereby certified that error appears in the printed specification of the above numbered patent requiring correction and that the said Letters Patent should read as corrected below.

Column 1, lines 66 and 67, for "gelatin" read --gelation--.

Signed and sealed this 18th day of February 1958.

(SEAL)
Attest:
KARL H. AXLINE
Attesting Officer

ROBERT C. WATSON
Commissioner of Patents